(12) United States Patent  
Balfour et al.

(10) Patent No.: US 8,637,131 B1
(45) Date of Patent: Jan. 28, 2014

(54) POLY(PHENYLENE ETHER) ARTICLE AND COMPOSITION

(71) Applicants: Kim G. Balfour, Delanson, NY (US); Kristopher Rexius, East Greenbush, NY (US)

(72) Inventors: Kim G. Balfour, Delanson, NY (US); Kristopher Rexius, East Greenbush, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/788,201

(22) Filed: Mar. 7, 2013

Related U.S. Application Data

(60) Provisional application No. 61/733,099, filed on Dec. 4, 2012, provisional application No. 61/731,800, filed on Nov. 30, 2012.

(51) Int. Cl.
  B29D 22/00 (2006.01)
  B29D 23/00 (2006.01)
  B32B 1/08 (2006.01)

(52) U.S. Cl.
  USPC ........... 428/35.7; 428/36.9; 525/89; 525/92 R

(58) Field of Classification Search
  USPC .............................. 525/92, 89; 428/35.7, 36.9
  See application file for complete search history.

(56) References Cited

U.S. PATENT DOCUMENTS

| | | | |
|---|---|---|---|
| 3,281,383 A | 10/1966 | Zelinski et al. | |
| 3,306,874 A | 2/1967 | Hay | |
| 3,639,517 A | 2/1972 | Kitchen et al. | |
| 3,660,531 A | 5/1972 | Lauchlan et al. | |
| 4,180,530 A | 12/1979 | Bi et al. | |
| 5,234,994 A | 8/1993 | Shiraki et al. | |
| 6,127,487 A | 10/2000 | Ahmed et al. | |
| 6,274,670 B1 | 8/2001 | Adedeji et al. | |
| 2003/0096123 A1 | 5/2003 | Yeager | |
| 2007/0112132 A1 | 5/2007 | Zhao et al. | |
| 2008/0045656 A1 | 2/2008 | Balfour et al. | |
| 2008/0206449 A1 | 8/2008 | Klei et al. | |
| 2008/0206468 A1 | 8/2008 | Klei et al. | |
| 2008/0251271 A1 | 10/2008 | Jeyakumar et al. | |
| 2009/0211967 A1 | 8/2009 | Delsman et al. | |
| 2010/0012373 A1 | 1/2010 | Guo et al. | |
| 2010/0122845 A1 | 5/2010 | Guo et al. | |
| 2010/0139944 A1 | 6/2010 | Guo et al. | |
| 2011/0266024 A1 | 11/2011 | Qiu et al. | |

FOREIGN PATENT DOCUMENTS

| | | |
|---|---|---|
| EP | 1512725 A1 | 3/2005 |
| WO | 2009043269 A2 | 4/2009 |
| WO | 2010030478 A2 | 3/2010 |

OTHER PUBLICATIONS

U.S. Appl. No. 13/626,953, filed with the USPTO Sep. 26, 2012.
U.S. Appl. No. 13/693,066, filed with the USPTO Dec. 4, 2012.
U.S. Appl. No. 13/693,076, filed with the USPTO Dec. 4, 2012.
Gachter and Muller, EDs, "Plastics Additives Handbook; Stabilizers, Processing Aids, Plasticizers, Fillers, Reinforcements, Colorants for Thermoplastics, 3rd Edition", New York: Hanser Publishers, 1990, in Chapter 9, "Fillers and Reinforcements", by H. P. Schlumpf.
Kuraray Septon S2104 Thermoplastic Rubber, Information Sheet, downloaded from http://www.matweb.com/search/datasheet. aspx?matguid=fde7a35f9f574598bc6bf726914d13da&ckck=1 [Jun. 5, 2010 6:44:40 AM] on Jun. 5, 2012, 2 pages.
International Search Report for International Application No. PCT/US2012/039047, International Filing Date May 23, 2012, Date of Mailing Dec. 26, 2012, 5 pages.
Written Opinion for International Application No. PCT/US2012/039047, International filing date May 23, 2012, Date of mailing Dec. 26, 2012, 6 pages.
International Search Report for International Application No. PCT/US2012/067829, International Application Filing Date Dec. 5, 2012, Date of Mailing Jun. 18, 2013, 6 pages.
Written Opinion for International Searching Authority; International Application No. PCT/US2012/067829; International Filing Date Dec. 5, 2012; Date of Mailing Jun. 18, 2013, 5 pages.

Primary Examiner — Michael C Miggins
(74) Attorney, Agent, or Firm — Cantor Colburn LLP

(57) ABSTRACT

Articles useful in the food packaging, food service, and healthcare industries are formed from a composition prepared by melt blending specific amounts of a poly(phenylene ether), a radial block copolymer of an alkenyl aromatic monomer and a conjugated diene, a polystyrene-poly(ethylene-butylene)-polystyrene triblock copolymer, a hydrogenated terpene resin, and benzoin. The composition provides optical clarity, heat resistance, and impact resistance to the articles.

13 Claims, No Drawings

POLY(PHENYLENE ETHER) ARTICLE AND COMPOSITION

CROSS REFERENCE TO RELATED APPLICATIONS

This application claims priority to U.S. Provisional Patent Application Ser. No. 61/731,800, filed Nov. 30, 2012, and U.S. Provisional Patent Application Ser. No. 61/733,099, filed Dec. 4, 2012, the contents of which are incorporated herein by reference in their entirety.

BACKGROUND OF THE INVENTION

Compositions containing poly(phenylene ether)s and styrenic block copolymers are known and valued for their improved properties relative to either resin type alone. For example, U.S. Pat. No. 3,660,531 to Lauchlan et al. describes blends of "polyphenylene oxide resin" with styrene-butadiene block copolymers and teaches that the blends exhibit a useful combination of low-temperature melt processability, high impact strength, and high flexural strength. As another example, U.S. Pat. No. 5,234,994 to Shiraki et al. describes blends of a "polyphenylene ether", a polystyrene, and a block copolymer of a vinyl aromatic hydrocarbon and a conjugated diene. The blends are described as offering improved transparency, impact resistance, surface hardness, heat resistance, and gloss. As yet another example, U.S. Pat. No. 6,274,670 to Adedeji et al. describes blends of a "polyphenylene ether resin", a non-elastomeric styrenic resin, and an unsaturated elastomeric styrenic block copolymer. When the non-elastomeric styrenic resin is a styrene-butadiene block copolymer having at least 50 weight percent styrene, the compositions are semi-transparent and exhibit enhanced processability.

Despite these advances, there remains a need for poly(phenylene ether) compositions that exhibit improved heat resistance and notched Izod impact strength while substantially maintaining optical properties. There is also a particular need for such compositions to be free of flame retardants, such as organophosphate esters, that would discourage their use in the food packaging, food service, and healthcare industries.

BRIEF SUMMARY OF EMBODIMENTS OF THE INVENTION

One embodiment is an article comprising a composition comprising the product of melt blending components comprising, based on the total weight of blended components: 44 to 74.9 weight percent poly(phenylene ether); 15 to 30 weight percent of a radial block copolymer of an alkenyl aromatic monomer and a conjugated diene; wherein the radial block copolymer comprises 60 to 70 weight percent of poly(alkenyl aromatic) content based on the weight of the radial block copolymer, and has a number average molecular weight of 50,000 to 70,000 atomic mass units; 7.5 to 15 weight percent of a polystyrene-poly(ethylene-butylene)-polystyrene triblock copolymer having a polystyrene content of 55 to 80 weight percent based on the weight of the triblock copolymer; 2.5 to 7.5 weight percent of a hydrogenated terpene resin having a softening point of 145 to 155° C. measured according to ASTM E28; and 0.1 to 2 weight percent of a hydroxy compound selected from the group consisting of hydroxyacetone, acetoin, allyl alcohol, pinacol, 2,3-diphenylbutane-2,3-diol, 2-butene-1,4-diol, benzyl alcohol, 1-phenylethanol, 2-hydroxyacetophenone, benzopinacol, benzoin, hydrobenzoin, 2-hydroxy-1-phenyl-2-p-tolyl-ethanone, benzhydrol, and combinations thereof; wherein the composition excludes flame retardants other than compounds approved for use as food additives by the United States Food and Drug Administration as of Oct. 31, 2006; and wherein the composition comprises less than 0.01 weight percent of trihydrocarbyl phosphites.

Another embodiment is an article comprising a composition comprising the product of melt blending components comprising, based on the total weight of blended components: 60 to 70 weight percent poly(phenylene ether); wherein the poly(phenylene ether) comprises 2,6-dimethyl-1,4-phenylene ether units, 2,3,6-trimethyl-1,4-phenylene ether units, or a combination thereof; 15 to 25 weight percent of a radial block copolymer of styrene and butadiene; wherein the radial block copolymer comprises 60 to 70 weight percent of polystyrene content based on the weight of the radial block copolymer, and has a number average molecular weight of 50,000 to 70,000 atomic mass units; 7.5 to 13 weight percent of a polystyrene-poly(ethylene-butylene)-polystyrene triblock copolymer comprises a polystyrene content of 60 to 75 weight percent based on the weight of the polystyrene-poly(ethylene-butylene)-polystyrene triblock copolymer; 3 to 7 weight percent of a hydrogenated terpene resin having a softening point of 145 to 155° C. measured according to ASTM E28; and 0.25 to 1 weight percent benzoin; wherein the composition excludes flame retardants other than compounds approved for use as food additives by the United States Food and Drug Administration as of Oct. 31, 2006; and wherein the composition excludes trihydrocarbyl phosphites.

Another embodiment is a composition comprising the product of melt blending components comprising, based on the total weight of blended components: 44 to 74.9 weight percent poly(phenylene ether); 15 to 30 weight percent of a radial block copolymer of an alkenyl aromatic monomer and a conjugated diene; wherein the radial block copolymer comprises 60 to 70 weight percent of poly(alkenyl aromatic) content based on the weight of the radial block copolymer, and has a number average molecular weight of 50,000 to 70,000 atomic mass units; 7.5 to 15 weight percent of a polystyrene-poly(ethylene-butylene)-polystyrene triblock copolymer having a polystyrene content of 55 to 80 weight percent based on the weight of the triblock copolymer; 2.5 to 7.5 weight percent of a hydrogenated terpene resin having a softening point of 145 to 155° C. measured according to ASTM E28; and 0.1 to 2 weight percent of a hydroxy compound selected from the group consisting of hydroxyacetone, acetoin, allyl alcohol, pinacol, 2,3-diphenylbutane-2,3-diol, 2-butene-1,4-diol, benzyl alcohol, 1-phenylethanol, 2-hydroxyacetophenone, benzopinacol, benzoin, hydrobenzoin, 2-hydroxy-1-phenyl-2-p-tolyl-ethanone, benzhydrol, and combinations thereof; wherein the composition excludes flame retardants other than compounds approved for use as food additives by the United States Food and Drug Administration as of Oct. 31, 2006; and wherein the composition comprises less than 0.01 weight percent of trihydrocarbyl phosphites.

These and other embodiments are described in detail below.

DETAILED DESCRIPTION OF THE INVENTION

The present inventors have determined that articles suitable for use in the food packaging, food service, and healthcare industries and exhibiting high light transmittance, low haze, high heat resistance, and high notched Izod impact strength can be prepared from a composition that omits flame retardants other than compounds approved for use as food additives by the United States Food and Drug Administration as of Oct. 31, 2006, and contains specific amounts of a poly (phenylene ether), a radial block copolymer, a polystyrene-poly(ethylene-butylene)-polystyrene triblock copolymer, a hydrogenated terpene resin, and a hydroxy compound. The absence of flame retardants other than compounds approved for use as food additives by the United States Food and Drug Administration as of Oct. 31, 2006 makes the articles more suitable for contact with humans and other animals.

The improved property balance exhibited by the composition can include a heat deflection temperature greater than or equal to 120° C., specifically greater than or equal to 125° C., more specifically greater than or equal to 130° C., determined according to ASTM D648-07, using a load of 1.82 megapascals; and a notched Izod impact strength greater than or equal to 40 joules/meter, specifically greater than or equal to 45 joules/meter, more specifically greater than or equal to 50 joules/meter, determined according to ASTM D256-08 at 23° C. In some embodiments, the heat deflection temperature is 120 to 140° C., specifically 125 to 140° C., more specifically 130 to 140° C.; and the notched Izod impact strength is 40 to 60 joules/meter, specifically 45 to 60 joules/meters, more specifically 50 to 60 joules/meter. The composition can exhibit desirable optical properties, including a percent transmittance greater than or equal to 75 percent, specifically greater than or equal to 77 percent, more specifically greater than or equal to 79 percent; and a haze value less than or equal to 5 percent, specifically less than or equal to 4.5 percent; wherein percent transmittance and haze are measured according to ASTM D1003-00 at 23° C. and a thickness of 3.2 millimeters. In some embodiments, the percent transmittance is 75 to 83 percent, specifically 77 to 83 percent, more specifically 75 to 83 percent; and the haze is 3.5 to 5 percent, specifically 3.5 to 4.5 percent.

One embodiment is an article comprising a composition comprising the product of melt blending components comprising, based on the total weight of blended components: 44 to 74.9 weight percent poly(phenylene ether); 15 to 30 weight percent of a radial block copolymer of an alkenyl aromatic monomer and a conjugated diene; wherein the radial block copolymer comprises 60 to 70 weight percent of poly(alkenyl aromatic) content based on the weight of the radial block copolymer, and has a number average molecular weight of 50,000 to 70,000 atomic mass units; 7.5 to 15 weight percent of a polystyrene-poly(ethylene-butylene)-polystyrene triblock copolymer having a polystyrene content of 55 to 80 weight percent based on the weight of the triblock copolymer; 2.5 to 7.5 weight percent of a hydrogenated terpene resin having a softening point of 145 to 155° C. measured according to ASTM E28; and 0.1 to 2 weight percent of a hydroxy compound selected from the group consisting of hydroxyacetone, acetoin, allyl alcohol, pinacol, 2,3-diphenylbutane-2,3-diol, 2-butene-1,4-diol, benzyl alcohol, 1-phenylethanol, 2-hydroxyacetophenone, benzopinacol, benzoin, hydrobenzoin, 2-hydroxy-1-phenyl-2-p-tolyl-ethanone, benzhydrol, and combinations thereof; wherein the composition excludes flame retardants other than compounds approved for use as food additives by the United States Food and Drug Administration as of Oct. 31, 2006; and wherein the composition comprises less than 0.01 weight percent of trihydrocarbyl phosphites.

Compared to corresponding articles prepared from compositions containing flame retardants other than compounds approved for use as food additives by the United States Food and Drug Administration as of Oct. 31, 2006, especially organophosphate ester flame retardants, the present article has the advantage of being suitable for contact with food or an exterior surface of an animal, such as a human being or a companion animal or a laboratory animal. Specific articles useful in the food service industry include food service trays, food service bins (including food storage bins, ingredient bins, and point-of-assembly containers), prepared food containers (including "clam shell" containers and other containers for warm and cold prepared foods), fluid reservoirs (including pitchers), measuring cups, scoops, and kitchen tools. Specific articles useful in the healthcare industry include transparent parts of medical devices (for example, humidifier face masks), transparent parts of delivery devices (for example, parts of devices for medicine delivery, parts of devices for fluid delivery, and parts of devices for nutrient delivery), transparent parts of diagnostic equipment (for example, parts for ultrasound devices, parts for x-ray computed tomography devices, and parts for heart rate monitors), containers for solids (for example, pill containers), and containers for liquids (for example, liquid medicine containers). Specific articles useful in the animal care industry include animal cages, water bowls, food bowls, and animal toys. The article can also be a toy for humans. The article can also be a window, or the transparent or translucent portion thereof. Specific articles useful as parts of industrial and household appliances include refrigerator door racks, refrigerator trays and bins, and door panels for front-loading washing machines.

The composition used to form the article is prepared by melt blending specific amounts of specific components that are described below. The melt-blending can be performed using common equipment such as ribbon blenders, Henschel mixers, Banbury mixers, drum tumblers, single-screw extruders, twin-screw extruders, multi-screw extruders, co-kneaders, and the like. For example, the present composition can be prepared by melt-blending the components in a twin-screw extruder at a temperature of 260 to 310° C., specifically 270 to 300° C.

Suitable methods of forming an article from the composition include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used. In some embodiments, the article is formed by injection molding using a barrel temperature of 250 to 320° C., specifically 260 to 310° C., and a mold temperature of 50 to 110° C., specifically 70 to 100° C. In some embodiments, the article is formed by a process comprising extrusion and thermoforming.

The components melt blended to prepare the composition comprise a poly(phenylene ether). Suitable poly(phenylene ether)s include those comprising repeating structural units having the formula

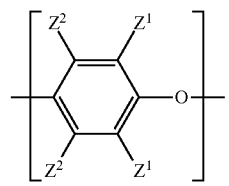

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) has an intrinsic viscosity of 0.25 to 1 deciliter per gram measured at 25° C. in chloroform using an Ubbelohde viscometer. Within this range, the poly(phenylene ether) intrinsic viscosity can be 0.3 to 0.65 deciliter per gram, more specifically 0.35 to 0.5 deciliter per gram, even more specifically 0.4 to 0.5 deciliter per gram.

In some embodiments, the poly(phenylene ether) is essentially free of incorporated diphenoquinone residues. In this context, "essentially free" means that less than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues). For example, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it can be useful to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with 1 to 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in U.S. Patent Application Publication No. US 2009/0211967 A1 of Delsman et al. In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) comprises a poly(2,6-dimethyl-1,4-phenylene ether). In some embodiments, the poly(phenylene ether) comprises a poly(2,6-dimethyl-1,4-phenylene ether) having an intrinsic viscosity of 0.3 to 0.65 deciliter per gram, more specifically 0.35 to 0.5 deciliter per gram, even more specifically 0.4 to 0.5 deciliter per gram, measured at 25° C. in chloroform.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof. In some embodiments, the composition comprises less than or equal to 0.5 weight percent (i.e., 0 to 0.5 weight percent) of a poly(phenylene ether)-polysiloxane block copolymer. Within this limit, the maximum amount of poly(phenylene ether)-polysiloxane block copolymer can be 0.1 weight percent. In some embodiments, the composition excludes poly(phenylene ether)-polysiloxane block copolymer.

The amount of poly(phenylene ether) melt blended with other components to form the composition is 44 to 74.9 weight percent, based on the total weight of the composition (which is equivalent to the total weight of components melt blended to form the composition). Within this range, the poly(phenylene ether) amount can be 55 to 72 weight percent, specifically 60 to 70 weight percent.

In addition to the poly(phenylene ether), the components melt blended to prepare the composition comprise a radial block copolymer of an alkenyl aromatic monomer and a conjugated diene. As used herein, the term "radial block copolymer" refers to a branched polymer comprising poly(conjugated diene) blocks, poly(alkenyl aromatic) blocks, and the residue of a coupling agent that acts as a branching point or radius of the radial block copolymer. More particularly, in the radial block copolymer structure, multiple chains of the poly(conjugated diene) polymer, usually three or more, are each covalently bound at one end to the residue of a coupling agent and covalently bound at the other end to a block of the poly(alkenyl aromatic). In some embodiments, the radial block copolymer consists of the poly(conjugated diene) blocks, the poly(alkenyl aromatic) blocks, and the residue of the coupling agent. For example, the radial block copolymer can exclude residues derived from other polymerizable monomers.

The alkenyl aromatic monomer used to form the radial block copolymer can have the structure

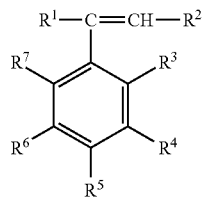

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$-$R^6$ each independently represent a hydrogen atom, a $C_1$-$C_8$ alkyl group, or a $C_2$-$C_8$ alkenyl group; or $R^3$ and $R^4$ are taken together with the central aromatic ring to form a naphthyl group, or $R^4$ and $R^5$ are taken together with the central aromatic ring to form a naphthyl group. Suitable alkenyl aromatic monomers include, for example, styrene, chlorostyrenes such as p-chlorostyrene, methylstyrenes such as alpha-methylstyrene and p-methylstyrene, and combinations thereof. In some embodiments, the alkenyl aromatic monomer is styrene.

The conjugated diene used to form the radial block copolymer can be, for example, 1,3-butadiene, 2-methyl-1,3-butadiene, 2-chloro-1,3-butadiene, 2,3-dimethyl-1,3-butadiene, 1,3-pentadiene, 1,3-hexadiene, and combinations thereof. In some embodiments, the conjugated diene is 1,3-butadiene. In some embodiments, the conjugated diene is 2-methyl-1,3-butadiene (isoprene).

The coupling agent can be any compound capable of joining at least three block copolymers. Examples of such compounds are multivinyl aromatic compounds, multiepoxide compounds (including epoxidized soybean oils), multiisocyanate compounds, multiimine compounds, multialdehyde compounds, multiketone compounds, multihalide compounds, multianhydride compounds, multiester compounds, and combinations thereof. The amount of coupling agent is typically 0.1 to 1 weight percent based on the weight of the radial block copolymer.

In some embodiments, the radial block copolymer comprises a poly(alkenyl aromatic) content of 55 to 70 weight percent, specifically 60 to 70 weight percent, more specifically 65 to 70 weight percent, based on the weight of the radial block copolymer. Poly(alkenyl aromatic) content can be determined by proton nuclear magnetic resonance spectroscopy ($^1$H NMR).

In some embodiments, the radial block copolymer has a number average molecular weight of 50,000 to 70,000 atomic mass units. Within this range, the number average molecular weight can be 57,000 to 67,000 atomic mass units. In some embodiments, the radial block copolymer has a weight average molecular weight of 130,000 to 170,000 atomic mass units, specifically 140,000 to 160,000 atomic mass units. In some embodiments, the radial block copolymer has a polydispersity (weight average molecular weight divided by number average molecular weight) of 1.94 to 2.98.

A gel permeation chromatography method for determining the molecular weight characteristics is as follows. A 20 milligram sample of block copolymer is dissolved in 20 milliliters chloroform with 2 parts per thousand by weight toluene (as a flow marker). After the block copolymer is dissolved, the sample is ready to be analyzed by gel permeation chromatography with detection at 254 nanometers. The chromatography equipment includes a Hewlett Packard HPLC 1100 series chromatograph equipped with a PL gel 5 micrometer*$10^3$ Å column, a PL gel 5 micrometer*$10^5$ Å column, and a 500 Å Styragel packing pre-column The columns are maintained at 35° C. during the analysis. The injection volume is 75 microliters, and injection samples are pre-filtered through a 0.45 micrometer "greenband" filter. The eluent is chloroform and the run time is 16 minutes. Data in the polystyrene molecular weight range of 2,000 to 1,000,000 atomic mass units (AMU) is used to calculate values of number average molecular weight and weight average molecular for the block copolymers. The analysis is calibrated with polystyrene monodisperse calibration standards, such as Polymer Laboratories Easivial Standards Part No. PL12541A.

In some embodiments, the radial block copolymer is not hydrogenated (that is, it is "unhydrogenated"). Specifically, residual aliphatic unsaturation in the poly(conjugated diene) block resulting from polymerization of the conjugated diene is not reduced by hydrogenation.

In some embodiments, the radial block copolymer is less than 5 percent crosslinked, based on the total number of aliphatic carbon-carbon double bonds in the radial block copolymer. Specifically, the radial block copolymer is not intentionally crosslinked by treatment with radiation or chemical agents capable of forming covalent crosslinks between the poly(conjugated diene) blocks of different radial block copolymer molecules.

Methods of preparing radial block copolymers are known in the art and include the methods described in, for example, U.S. Pat. Nos. 3,281,383 to Zelinski et al., 3,639,517 to Kitchen et al., 4,180,530 to Bi et al., and 6,127,487 to Ahmed et al. Radial block copolymers are also commercially available as K-RESIN from Chevron Phillips Chemical Company, including KK38, KR01, KR03, and KR05.

In some embodiments, the radial block copolymer has a polystyrene content of 65 to 70 weight percent, a polybutadiene content of 29 to 35 weight percent, a number average molecular weight of 57,000 to 67,000 atomic mass units, a weight average molecular weight of 130,000 to 170,000 atomic mass units, and a polydispersity (weight average molecular weight divided by number average molecular weight) of 1.94 to 2.98. In some embodiments, this radial block copolymer comprises a first polystyrene block with a first number average molecular weight and a second polystyrene block with a second number average molecular weight that is at least two times the first number average molecular weight. Radial block copolymers described in this paragraph can be prepared according to the method of U.S. Pat. No. 3,281,383 to Kitchen et al. In some embodiments, the radial block copolymer has 20 to 30 weight percent of the residue of 1,4-addition of butadiene, and 2 to 12 weight percent of the residue of 1,2-addition of butadiene, and a ratio of 1,4-addition to 1,2-addition of 2.5:1 to 5:1. In some embodiments of the radial block copolymer, among the residue of 1,4-addition of butadiene the ratio of cis to trans double bonds is 1:1 to 2:1. The weight percents of residues of 1,2-addition of butadiene and 1,4-addition of butadiene, as well as the ratio of cis to trans double bonds in the residue of 1,4-addition of butadiene, can be determined by $^1$H NMR. A suitable example of a radial block copolymer as described in this paragraph is K-RESIN KK38 from Chevron Phillips, having a polystyrene content of about 68 weight percent, a polybutadiene content of about 32 weight percent, a number average molecular weight of about 63,000, a weight average molecular weight of about 149,000, and a polydispersity of about 2.4, and a melt flow rate of about 9 grams per 10 minutes measured at 200° C. and 5 kilograms load according to ASTM D1238-10. K-RESIN KK38 has about 25 weight percent of the residue of 1,4-addition of butadiene, and about 7 weight percent of the residue of 1,2-addition of butadiene, corresponding to a ratio of 1,4-addition to 1,2-addition of about 3.6:1. Among the residue of 1,4-addition of butadiene, the ratio of cis to trans double bonds is about 1.4:1.

The amount of the radial block copolymer melt blended with other components to form the composition is 15 to 30 weight percent, based on the total weight of the composition (which is equivalent to the total weight of components melt blended to form the composition). Within this range, the radial block copolymer amount can be 15 to 25 weight percent, specifically 17 to 23 weight percent.

In addition to the poly(phenylene ether) and the radial block copolymer, the components melt blended to prepare the composition include a polystyrene-poly(ethylene-butylene)-polystyrene triblock copolymer having a polystyrene content of 55 to 80 weight percent, based on the weight of the triblock copolymer. Within the range of 55 to 80 weight percent, the polystyrene content can be 60 to 75 weight percent.

The poly(ethylene-butylene) block of the polystyrene-poly(ethylene-butylene)-polystyrene triblock copolymer is derived from hydrogenation of the polybutadiene block of a polystyrene-polybutadiene-polystyrene triblock copolymer.

In some embodiments, the polystyrene-poly(ethylene-butylene)-polystyrene triblock copolymer excludes the residue of monomers other than styrene and butadiene. In these embodiments, it does not comprise grafts formed from these or any other monomers. It also consists of carbon and hydrogen atoms and therefore excludes heteroatoms.

Methods for preparing polystyrene-poly(ethylene-butylene)-polystyrene triblock copolymer are known in the art and polystyrene-poly(ethylene-butylene)-polystyrene triblock copolymers are commercially available. Illustrative commercially available polystyrene-poly(ethylene-butylene)-polystyrene triblock copolymers include KRATON A1535 H Polymer comprising 57 weight percent polystyrene and available from Kraton Performance Polymers Inc.; TUFTEC H1043 comprising 67 weight percent polystyrene and available from Asahi Kasei Elastomer; SEPTON 8104 comprising 60 weight polystyrene and available from Kuraray; and SEPTON 8105 comprising 65 weight percent polystyrene and available from Kuraray. Mixtures of two of more polystyrene-poly(ethylene-butylene)-polystyrene triblock copolymers can be used.

In some embodiments, the polystyrene-poly(ethylene-butylene)-polystyrene triblock copolymer has a polystyrene content of 60 to 70 weight percent, based on the weight of the triblock copolymer. Suitable examples of such triblock copolymers include TUFTEC H1043, SEPTON 8104, SEPTON 8105, and combinations thereof. In some embodiments, the polystyrene-poly(ethylene-butylene)-polystyrene triblock copolymer has a polystyrene content of 65 to 70 weight percent, based on the weight of the triblock copolymer. An example of such a triblock copolymer is TUFTEC H1043.

The amount of polystyrene-poly(ethylene-butylene)-polystyrene triblock copolymer melt blended with other components to form the composition is 7.5 to 15 weight percent, based on the total weight of the composition (which is equivalent to the total weight of components melt blended to form the composition). Within this range, the polystyrene-poly(ethylene-butylene)-polystyrene triblock copolymer amount can be 7.5 to 13 weight percent, specifically 8 to 12 weight percent.

In addition to the poly(phenylene ether), the radial block copolymer, and the polystyrene-poly(ethylene-butylene)-polystyrene triblock copolymer, the components melt blended to prepare the composition include a hydrogenated terpene resin. The hydrogenated terpene resin has a softening point of 135 to 155° C., specifically 145 to 155° C., measured according to ASTM E28-99 (2009). Suitable hydrogenated terpene resins are commercially available and include, for example, ARKON P140 available from Arakawa Chemical Company, and CLEARON P150, available from Yasuhara Chemical. In some embodiments, the hydrogenated terpene resin has a softening point of 145 to 155° C. An example of such a hydrogenated terpene resin is CLEARON P150, available from Yasuhara Chemical.

The amount of hydrogenated terpene resin melt blended with other components to form the composition is 2.5 to 7.5 weight percent, based on the total weight of the composition (which is equivalent to the total weight of components melt blended to form the composition). Within this range, the hydrogenated terpene resin amount can be 3 to 7 weight percent, specifically 4 to 6 weight percent.

In addition to the poly(phenylene ether), the radial block copolymer, the polystyrene-poly(ethylene-butylene)-polystyrene triblock copolymer, and the hydrogenated terpene resin, the components melt blended to prepare the composition includes a hydroxy compound. Suitable hydroxy compounds include hydroxyacetone (1-hydroxy-2-propanone), acetoin (3-hydroxy-2-butanone), allyl alcohol, pinacol (2,3-dimethyl-2,3-dihydroxybutane), 2,3-diphenylbutane-2,3-diol, 2-butene-1,4-diol, benzyl alcohol, 1-phenylethanol, 2-hydroxyacetophenone, benzopinacol (1,1,2,2-tetraphenylethane-1,2-diol), benzoin (2-hydroxy-2-phenylacetophenone), hydrobenzoin (1,2-diphenylethane-1,2-diol), 2-hydroxy-1-phenyl-2-p-tolyl-ethanone, benzhydrol (diphenylmethanol), and combinations thereof. In some embodiments, the hydroxy compound comprises benzoin (CAS Reg. No. 119-53-9). The amount of hydroxy compound melt blended with other components to form the composition is 0.1 to 2 weight percent, based on the total weight of the composition (which is equivalent to the total weight of components melt blended to form the composition). Within this range, the hydroxy compound amount can be 0.2 to 1.5 weight percent, specifically 0.25 to 1 weight percent.

The composition comprises less than 0.01 weight percent of a trihydrocarbyl phosphite. A trihydrocarbyl phosphite is a compound having the general formula $P(OR^8)_3$, wherein each occurrence of $R^8$ is independently $C_1$-$C_{24}$ hydrocarbyl. Trihydrocarbyl phosphites include trialkyl phosphites wherein each occurrence of $R^8$ is independently $C_1$-$C_{24}$ alkyl. One example of a trialkyl phosphite is tridecyl phosphite. Trihydrocarbyl phosphites further include aryl phosphites in which at least one occurrence of $R^8$ is an unsubstituted or substituted $C_6$-$C_{24}$ aryl. In some embodiments, the composition excludes trihydrocarbyl phosphites.

The composition can, optionally, further comprise one or more additives known in the thermoplastics art, as long as they do not substantially detract from the desired properties of the composition. For example, the composition can, optionally, further comprise an additive chosen from stabilizers, mold release agents, lubricants, processing aids, drip retardants, nucleating agents, UV blockers, dyes, antioxidants, anti-static agents, blowing agents, mineral oil, metal deactivators, antiblocking agents, and the like, and combinations thereof. Particularly suitable stabilizers and amounts are pentaerythritol tetrakis(3-(3,5-di-tert-butyl-4-hydroxyphenyl) propionate) (CAS Reg. No. 6683-19-80) at up to 0.5 weight percent; distearyl thiodipropionate (CAS Reg. No. 693-36-7); 3,9-bis[2,4-bis(1-methyl-1-phenylethyl)phenoxy]-2,4,8,10-tetraoxa-3,9-diphosphaspiro[5.5]undecane (CAS Reg. No. 154862-43-8) at up to 0.15 weight percent; 2-propenoic acid, 2-cyano-3,3-diphenyl-,1,1'-[2,2-bis[[(2-cyano-1-oxo-3,3-diphenyl-2-propen-1-yDoxy]methyl]-1,3-propanediyl] ester; (CAS Reg. No. 178671-58-4) at up to 0.5 weight percent; 2,2-bis[[3-dodecylthio)-1-oxopropoxy]methyl] propane-1,3-diyl bis[3-(dodecylthio)propionate] (CAS Reg. No. 29598-76-3) at up to 0.6 weight percent; tris(2,4-di-tert-butylphenyl) phosphite (CAS Reg. No. 31570-04-4) at up to 0.2 weight percent; octadecyl 3-(3,5-di-tert-butyl-4-hydroxyphenyl)propionate (CAS Reg. No. 2082-79-3) at up to 0.25 weight percent; and tetrakis(2,4-di-tert-butylphenyl)-4,4-biphenyldiphosphonite (CAS Reg. No. 119345-01-6) at up to 0.25 weight percent. When present, such additives are typically used in a total amount of less than or equal to 5 weight percent, specifically less than or equal to 2 weight percent, more specifically less than or equal to 1 weight percent, based on the total weight of the composition.

The composition excludes flame retardants other than compounds approved for use as food additives by the United States Food and Drug Administration as of Oct. 31, 2006. A list of compounds approved for use as food additives by the United States Food and Drug Administration as of Oct. 31, 2006 is appended. Aluminum hydroxide, calcium hydroxide, magnesium hydroxide, magnesium oxide, and zinc oxide are examples of flame retardants that are not necessarily excluded because they are approved for use as food additives by the United States Food and Drug Administration as of Oct. 31, 2006. However, their use can detract from the optical clarity that is desired for some applications, so in some embodiments they are minimized (for example, used in an amount less than or equal to 1 weight percent, based on the weight of the composition) or excluded. Excluded flame retardants include, for example, halogen-containing flame retardants (such as decabromodiphenyl ether, ethylene bis(tetrabromophthalimide, tetrabromobisphenol A, brominated polystyrene, and dechlorane plus), antimony oxide, organophosphate esters (such as resorcinol bis(diphenyl phosphate) and bisphenol A bis(diphenyl phosphate)), metal dialkylphosphinates (such as aluminum tris(diethylphosphinate), phosphine oxides, phosphonium compounds, phosphonates, elemental red phosphorus, metal borate salts (such as zinc borate), and melamine-containing flame retardants (such as melamine phosphate, melamine pyrophosphate, melamine polyphosphate, and melamine cyanurate). In some embodiments, the composition excludes flame retardants, including any flame retardants approved for use as food additives by the United States Food and Drug Administration as of Oct. 31, 2006. For the purposes of this application, it will be understood that the poly(phenylene ether) is not considered a flame retardant. In some embodiments, the composition excludes halogens. Additional flame retardants are described in R. Gachter and H. Muller, Editors, "Plastics Additives Handbook; Stabilizers, Processing Aids, Plasticizers, Fillers, Reinforcements, Colorants for Thermoplastics, 3rd Edition", New York: Hanser Publishers, 1990, in Chapter 12, "Flame Retardants", by H. J. Troitzsch.

The composition can, optionally, minimize or exclude polymers other than the poly(phenylene ether), the radial block copolymer, the polystyrene-poly(ethylene-butylene) polystyrene triblock copolymer, and the hydrogenated terpene resin. For example, in some embodiments, the composition comprises less than or equal to 1 weight percent (i.e., 0 to 1 weight percent) of each of polyamides, polyolefins, and polyesters. Within this limit, the maximum amount of these polymers can be 0.5 weight percent, or 0.1 weight percent. In some embodiments, the composition excludes these polymers. In some embodiments, the composition excludes polymers other than the poly(phenylene ether), the radial block copolymer, the polystyrene-poly(ethylene-butylene) polystyrene triblock copolymer, and the hydrogenated terpene resin.

In some embodiments, the components melt-blended to form the composition comprise less than 1 weight percent each, specifically less than 0.1 weight percent each, of homopolystyrenes and rubber-modified polystyrenes. In some embodiments, the components melt-blended to form the composition exclude homopolystyrenes and rubber-modified polystyrenes.

The composition can, optionally, minimize or exclude fillers that detract from the desired optical properties of the composition. Such fillers include, for example, fibrous fillers (such as glass fibers), platy fillers (such as talc, clay, and mica), and nonreinforcing fillers (such as silica and alumina) Additional fillers, including those characterized as "reinforcements" are described in R. Gachter and H. Muller, Editors, "Plastics Additives Handbook; Stabilizers, Processing Aids, Plasticizers, Fillers, Reinforcements, Colorants for Thermoplastics, 3rd Edition", New York: Hanser Publishers, 1990, in Chapter 9, "Fillers and Reinforcements", by H. P. Schlumpf. In some embodiments, the composition comprises less than or equal to 1 weight percent (i.e., 0 to 1 weight percent) of fillers, based on the total weight of the composition. Within this limit, the maximum filler amount can be 0.5 weight percent, or 0.1 weight percent. In some embodiments, the composition excludes fillers.

In a very specific embodiment of the article, the poly(phenylene ether) comprises 2,6-dimethyl-1,4-phenylene ether units, 2,3,6-trimethyl-1,4-phenylene ether units, or a combination thereof, the components melt-blended to form the composition comprise 60 to 70 weight percent poly(phenylene ether); the components melt-blended to form the composition comprise 15 to 25 weight percent of the radial block copolymer; the polystyrene-poly(ethylene-butylene)-polystyrene triblock copolymer comprises a polystyrene content of 60 to 75 weight percent based on the weight of the polystyrene-poly(ethylene-butylene)-polystyrene triblock copolymer; the components melt-blended to form the composition comprise 7.5 to 13 weight percent of the polystyrene-poly(ethylene-butylene)-polystyrene triblock copolymer; the components melt-blended to form the composition comprise 3 to 7 weight percent of the hydrogenated terpene resin; the hydroxy compound comprises benzoin; the components melt-blended to form the composition comprise 0.25 to 1 weight percent of the hydroxy compound; and the composition excludes trihydrocarbyl phosphites.

The invention includes the composition used to form the article. Thus, one embodiment is a composition comprising the product of melt blending components comprising, based on the total weight of blended components: 44 to 74.9 weight percent poly(phenylene ether); 15 to 30 weight percent of a radial block copolymer of an alkenyl aromatic monomer and a conjugated diene; wherein the radial block copolymer comprises 60 to 70 weight percent of poly(alkenyl aromatic) content based on the weight of the radial block copolymer, and has a number average molecular weight of 50,000 to 70,000 atomic mass units; 7.5 to 15 weight percent of a polystyrene-poly(ethylene-butylene)-polystyrene triblock copolymer having a polystyrene content of 55 to 80 weight percent based on the weight of the triblock copolymer; 2.5 to 7.5 weight percent of a hydrogenated terpene resin having a softening point of 145 to 155° C. measured according to ASTM E28; and 0.1 to 2 weight percent of a hydroxy compound selected from the group consisting of hydroxyacetone, acetoin, allyl alcohol, pinacol, 2,3-diphenylbutane-2,3-diol, 2-butene-1,4-diol, benzyl alcohol, 1-phenylethanol, 2-hydroxyacetophenone, benzopinacol, benzoin, hydrobenzoin, 2-hydroxy-1-phenyl-2-p-tolyl-ethanone, benzhydrol, and combinations thereof; wherein the composition excludes flame retardants other than compounds approved for use as food additives by the United States Food and Drug Administration as of Oct. 31, 2006; and wherein the composition comprises less than 0.01 weight percent of trihydrocarbyl phosphites.

All of the compositional variations described above in the context of the article apply as well to the composition itself. In a very specific embodiment of the composition, the poly(phenylene ether) comprises 2,6-dimethyl-1,4-phenylene ether units, 2,3,6-trimethyl-1,4-phenylene ether units, or a combination thereof; the components melt-blended to form the composition comprise 60 to 70 weight percent poly(phenylene ether); the components melt-blended to form the composition comprise 15 to 25 weight percent of the radial block copolymer; the polystyrene-poly(ethylene-butylene)-polystyrene triblock copolymer comprises a polystyrene content of 60 to 75 weight percent based on the weight of the polystyrene-poly(ethylene-butylene)-polystyrene triblock copolymer; the components melt-blended to form the composition comprise 7.5 to 13 weight percent of the polystyrene-poly(ethylene-butylene)-polystyrene triblock copolymer; the components melt-blended to form the composition comprise 3 to 7 weight percent of the hydrogenated terpene resin; the hydroxy compound comprises benzoin; the components melt-blended to form the composition comprise 0.25 to 1 weight percent of the hydroxy compound; and the composition excludes trihydrocarbyl phosphites.

The invention includes at least the following embodiments.

Embodiment 1

An article comprising a composition comprising the product of melt blending components comprising, based on the total weight of blended components: 44 to 74.9 weight percent poly(phenylene ether); 15 to 30 weight percent of a radial block copolymer of an alkenyl aromatic monomer and a conjugated diene; wherein the radial block copolymer comprises 60 to 70 weight percent of poly(alkenyl aromatic) content based on the weight of the radial block copolymer, and has a number average molecular weight of 50,000 to 70,000 atomic mass units; 7.5 to 15 weight percent of a polystyrene-poly(ethylene-butylene)-polystyrene triblock copolymer having a polystyrene content of 55 to 80 weight percent based on the weight of the triblock copolymer; 2.5 to 7.5 weight percent of a hydrogenated terpene resin having a softening point of 145 to 155° C. measured according to ASTM E28; and 0.1 to 2 weight percent of a hydroxy compound selected from the group consisting of hydroxyacetone, acetoin, allyl alcohol, pinacol, 2,3-diphenylbutane-2,3-diol, 2-butene-1,4-diol, benzyl alcohol, 1-phenylethanol, 2-hydroxyacetophenone, benzopinacol, benzoin, hydrobenzoin, 2-hydroxy-1-phenyl-2-p-tolyl-ethanone, benzhydrol, and combinations thereof; wherein the composition excludes flame retardants other than compounds approved for use as food additives by the United States Food and Drug Administration as of Oct. 31, 2006; and wherein the composition comprises less than 0.01 weight percent of trihydrocarbyl phosphites.

Embodiment 2

The article of embodiment 1, wherein the article is a food service article selected from the group consisting of food service trays, food service bins, prepared food containers, fluid reservoirs, measuring cups, scoops, and kitchen tools.

Embodiment 3

The article of embodiment 1, wherein the article is a healthcare article selected from the group consisting of transparent parts of medical devices, transparent parts of delivery devices, transparent parts of diagnostic equipment, containers for solids, and containers for liquids.

Embodiment 4

The article of embodiment 1, wherein the article is an animal care article selected from the group consisting of animal cages, water bowls, food bowls, and animal toys.

Embodiment 5

The article of embodiment 1, wherein the article is a toy.

Embodiment 6

The article of embodiment 1, wherein the article is an appliance part selected from the group consisting of refrigerator door racks, refrigerator trays, refrigerator bins, and door panels for front-loading washing machines.

Embodiment 7

The article of any of embodiments 1-6, wherein the polystyrene-poly(ethylene-butylene)-polystyrene triblock copolymer has a polystyrene content of 60 to 75 weight percent.

Embodiment 8

The article of any of embodiments 1-7, wherein the composition comprises less than 1 weight percent of each of polyolefins, polyamides, and polyesters.

Embodiment 9

The article of any of embodiments 1-7, wherein the composition comprises less than 0.1 weight percent of any polymer other than the poly(phenylene ether), the radial block copolymer, the polystyrene-poly(ethylene-butylene)-polystyrene triblock copolymer, and the hydrogenated terpene resin.

Embodiment 10

The article of any of embodiments 1-9, wherein the composition excludes flame retardants.

Embodiment 11

The article of claim 1, wherein the poly(phenylene ether) comprises 2,6-dimethyl-1,4-phenylene ether units, 2,3,6-trimethyl-1,4-phenylene ether units, or a combination thereof;

wherein the components melt-blended to form the composition comprise 60 to 70 weight percent poly(phenylene ether); wherein the components melt-blended to form the composition comprise 15 to 25 weight percent of the radial block copolymer; wherein the polystyrene-poly(ethylene-butylene)-polystyrene triblock copolymer comprises a polystyrene content of 60 to 75 weight percent based on the weight of the polystyrene-poly(ethylene-butylene)-polystyrene triblock copolymer; wherein the components melt-blended to form the composition comprise 7.5 to 13 weight percent of the polystyrene-poly(ethylene-butylene)-polystyrene triblock copolymer; wherein the components melt-blended to form the composition comprise 3 to 7 weight percent of the hydrogenated terpene resin; wherein the hydroxy compound comprises benzoin; wherein the components melt-blended to form the composition comprise 0.25 to 1 weight percent of the hydroxy compound; and wherein the composition excludes trihydrocarbyl phosphites.

Embodiment 11a

An article comprising a composition comprising the product of melt blending components comprising, based on the total weight of blended components: 60 to 70 weight percent poly(phenylene ether); wherein the poly(phenylene ether) comprises 2,6-dimethyl-1,4-phenylene ether units, 2,3,6-trimethyl-1,4-phenylene ether units, or a combination thereof; 15 to 25 weight percent of a radial block copolymer of styrene and butadiene; wherein the radial block copolymer comprises 60 to 70 weight percent of polystyrene content based on the weight of the radial block copolymer, and has a number average molecular weight of 50,000 to 70,000 atomic mass units; 7.5 to 13 weight percent of a polystyrene-poly(ethylene-butylene)-polystyrene triblock copolymer comprises a polystyrene content of 60 to 75 weight percent based on the weight of the polystyrene-poly(ethylene-butylene)-polystyrene triblock copolymer; 3 to 7 weight percent of a hydrogenated terpene resin having a softening point of 145 to 155° C. measured according to ASTM E28; and 0.25 to 1 weight percent benzoin; wherein the composition excludes flame retardants other than compounds approved for use as food additives by the United States Food and Drug Administration as of Oct. 31, 2006; and wherein the composition excludes trihydrocarbyl phosphites.

Embodiment 12

A composition comprising the product of melt blending components comprising, based on the total weight of blended components: 44 to 74.9 weight percent poly(phenylene ether); 15 to 30 weight percent of a radial block copolymer of an alkenyl aromatic monomer and a conjugated diene; wherein the radial block copolymer comprises 60 to 70 weight percent of poly(alkenyl aromatic) content based on the weight of the radial block copolymer, and has a number average molecular weight of 50,000 to 70,000 atomic mass units; 7.5 to 15 weight percent of a polystyrene-poly(ethylene-butylene)-polystyrene triblock copolymer having a polystyrene content of 55 to 80 weight percent based on the weight of the triblock copolymer; 2.5 to 7.5 weight percent of a hydrogenated terpene resin having a softening point of 145 to 155° C. measured according to ASTM E28; and 0.1 to 2 weight percent of a hydroxy compound selected from the group consisting of hydroxyacetone, acetoin, allyl alcohol, pinacol, 2,3-diphenylbutane-2,3-diol, 2-butene-1,4-diol, benzyl alcohol, 1-phenylethanol, 2-hydroxyacetophenone, benzopinacol, benzoin, hydrobenzoin, 2-hydroxy-1-phenyl-2-p-tolyl-ethanone, benzhydrol, and combinations thereof; wherein the composition excludes flame retardants other than compounds approved for use as food additives by the United States Food and Drug Administration as of Oct. 31, 2006; and wherein the composition comprises less than 0.01 weight percent of trihydrocarbyl phosphites.

Embodiment 13

The composition of embodiment 12, wherein the poly(phenylene ether) comprises 2,6-dimethyl-1,4-phenylene ether units, 2,3,6-trimethyl-1,4-phenylene ether units, or a combination thereof; wherein the components melt-blended to form the composition comprise 60 to 70 weight percent poly(phenylene ether); wherein the components melt-blended to form the composition comprise 15 to 25 weight percent of the radial block copolymer; wherein the polystyrene-poly(ethylene-butylene)-polystyrene triblock copolymer comprises a polystyrene content of 60 to 75 weight percent based on the weight of the polystyrene-poly(ethylene-butylene)-polystyrene triblock copolymer; wherein the components melt-blended to form the composition comprise 7.5 to 13 weight percent of the polystyrene-poly(ethylene-butylene)-polystyrene triblock copolymer; wherein the components melt-blended to form the composition comprise 3 to 7 weight percent of the hydrogenated terpene resin; wherein the hydroxy compound comprises benzoin; wherein the components melt-blended to form the composition comprise 0.25 to 1 weight percent of the hydroxy compound; wherein the composition excludes flame retardants; and wherein the composition excludes trihydrocarbyl phosphites.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples 1 and 2, Comparative Examples 1-3

These examples illustrate preparation of compositions and their use to form physical property test articles. Components used in these examples are summarized in Table 1.

TABLE 1

| Component | Description |
|---|---|
| PPE | Poly(2,6-dimethyl-1,4-phenylene ether), CAS Reg. No. 24938-67-8, having an intrinsic viscosity of about 0.46 deciliter per gram as measured in chloroform at 25° C.; obtained as PPO 646 from SABIC Innovative Plastics. |
| Benzoin | Benzoin (2-hydroxy-2-phenylacetophenone), CAS Reg. No. 119-53-9, obtained from Sinbiotic S.A. DE c.v. (Mexico). |
| HTP | Hydrogenated homopolymer of 1-methyl-4-(1-methylethenyl)-cyclohexene (hydrogenated terpene polymer), CAS Reg. No. 106168-39-2; obtained as CLEARON P150 from Yasuhara Chemical. |
| RBC KK38 | Radial block copolymer of styrene and butadiene having a polystyrene content of about 68 weight percent and a melt flow rate of about 9 grams per 10 minutes measured at 200° C. and 5 kilograms load; obtained as K-RESIN KK38 from Chevron Phillips Chemical Company. |
| SEBS H1043 | Polystyrene-poly(ethylene-butylene)-polystyrene |

TABLE 1-continued

| Component | Description |
|---|---|
| | triblock copolymer, CAS Reg. No. 66070-58-4, having a polystyrene content of about 67 weight percent; obtained as TUFTEC H1043 from AKelastomer. |
| RDP | Resorcinol bis(diphenyl phosphate), CAS Reg. No. 57583-54-7; obtained as CR-733S from Daihachi Chemical., as FYROLFLEX RDP from Supresta LLC, or as REOFOS RDP from Great Lakes Chemical Co. Ltd. |
| BPADP | Bisphenol A bis(diphenyl phosphate), CAS Reg. No. 181028-79-5; obtained as CR-741 from Daihachi Chemical, as FYROLFLEX BDP from Supresta LLC, or as REOFOS BAPP from Great Lakes Chemical Co. Ltd. |
| TPP | Triphenyl phosphate, CAS Reg. No. 115-86-6; obtained from Akzo Nobel. |

The compositions are summarized in Table 2, where all component amounts are expressed in weight percent based on the total weight of the composition. The compositions were prepared from individual components as follows. Components were compounded in a Werner & Pfleiderer twin-screw extruder having a 30 millimeter internal diameter and operating with barrel temperatures of 240° C./260° C./280° C./290° C./290° C. from feed throat to die. All components were added at the feed throat of the extruder, except for radial block copolymer, which was added downstream at barrel 7 of 10. The extrudate was pelletized, and the pellets dried for a minimum of 2 hours at 90° C. prior to subsequent use for injection molding. The compositions were injection molded into articles for physical testing. Injection molding was conducted on a Van Dorn 120T injection molding machine using barrel temperatures of 530-600° F. (266.7-315.6° C.) and a mold temperature of 190° F. (87.7° C.).

Flexural modulus values, expressed in units of megapascals, were determined at 23° C. according ASTM D790-07e1, using bar cross-sectional dimensions of 3.2 millimeters by 12.7 millimeters, a support span of 50.8 millimeters, a test speed of 1.27 millimeters/minute (0.05 inches/minute), and three specimens per composition. Heat deflection temperature values, expressed in units of degrees centigrade, were determined according to ASTM D648-07, using bar cross-sectional dimensions of 3.2 millimeters by 12.7 millimeters, an edgewise test direction, a support span of 100 millimeters, a load of 1.82 megapascals, a heating rate of 2.0° C./minute, a deflection at reading of 0.25 millimeters, and three specimens per composition. Notched Izod impact strength values, expressed in units of joules/meter, were determined at 23° C. according to ASTM D256-08, using bar cross-sectional dimensions of 3.2 millimeters by 12.7 millimeters, a Method A notch with a notch angle of 45° and a notch radius of 0.25 millimeters and a 10.16 millimeter depth of material under the notch, a hammer energy of 2.71 joules (2 foot-pounds), and five specimens per composition. Multi-axial impact strength values, expressed in units of joules, were determined at 23° C. according to ASTM D3763-08 using a test velocity of 3.3 meters per second, a specimen thickness of 3.2 millimeters, a clamp hole diameter of 76 millimeters, a dart diameter of 12.7 millimeters, and 5 specimens per composition. Tensile elongation values, expressed in units of percent, and tensile strength at yield values, expressed in units of megapascals, were determined at 23° C. according to ASTM D638-08, using a Type I bar, a bar thickness of 3.2 millimeters, a gage length of 50 millimeters, a grip separation of 115 millimeters, a testing speed of 50 millimeters/minute, and 5 specimens per composition. Transmittance and haze values, each expressed in units of percent, were determined at 23° C. according to ASTM D1003-00 at a thickness of 3.2 millimeters.

The property results in Table 2 show that the Example 1 and 2 compositions exhibits much greater heat deflection temperatures and notched Izod impact strengths, relative to Comparative Examples 1-3. Inventive Examples 1 and 2 also exhibit higher flexural modulus and tensile strength values relative to Comparative Examples 1-3. The optical properties transmittance and haze are comparable for the inventive and comparative examples.

TABLE 2

| | Ex. 1 | Ex. 2 | C. Ex. 1 | C. Ex. 2 | C. Ex. 3 |
|---|---|---|---|---|---|
| COMPOSITIONS | | | | | |
| PPE | 64.5 | 67.2 | 45.0 | 45.0 | 45.0 |
| RBC KK38 | 20.0 | 18.0 | 25.0 | 25.0 | 25.0 |
| SEBS H1043 | 10.0 | 9.0 | 12.5 | 12.5 | 12.5 |
| HTP | 5.0 | 5.0 | 5.0 | 5.0 | 5.0 |
| Benzoin | 0.5 | 0.4 | 0.5 | 0.5 | 0.5 |
| RDP | 0.0 | 0.0 | 12.0 | 0.0 | 0.0 |
| BPADP | 0.0 | 0.0 | 0.0 | 12.0 | 0.0 |
| TPP | 0.0 | 0.0 | 0.0 | 0.0 | 12.0 |
| PROPERTIES | | | | | |
| Flex. mod. (MPa) | 2430 | 2430 | 2180 | 2330 | 2070 |
| HDT (° C.) | 130 | 134 | 76.7 | 82.4 | 75.5 |
| Notched Izod (J/m) | 54.0 | 50.0 | 30.2 | 29.3 | 25.8 |
| MAI (J) | 38.0 | 42.5 | 54.6 | 5.0 | 49.9 |
| Tens. elong. (%) | 70 | 43 | 33 | 25 | 51 |
| Tens. strength (MPa) | 67 | 69 | 56.8 | 61.6 | 52.2 |
| Transmittance (%) | 80.0 | 78.9 | 80.9 | 82.1 | 82.6 |
| Correlated Haze (%) | 4.0 | 4.4 | 4.0 | 4.3 | 3.3 |

The invention claimed is:

1. An article comprising a composition comprising the product of melt blending components comprising, based on the total weight of blended components:
    44 to 74.9 weight percent poly(phenylene ether);
    15 to 30 weight percent of a radial block copolymer of an alkenyl aromatic monomer and a conjugated diene; wherein the radial block copolymer comprises 60 to 70 weight percent of poly(alkenyl aromatic) content based on the weight of the radial block copolymer, and has a number average molecular weight of 50,000 to 70,000 atomic mass units;
    7.5 to 15 weight percent of a polystyrene-poly(ethylene-butylene)-polystyrene triblock copolymer having a polystyrene content of 55 to 80 weight percent based on the weight of the triblock copolymer;
    2.5 to 7.5 weight percent of a hydrogenated terpene resin having a softening point of 145 to 155° C. measured according to ASTM E28; and
    0.1 to 2 weight percent of a hydroxy compound selected from the group consisting of hydroxyacetone, acetoin, allyl alcohol, pinacol, 2,3-diphenylbutane-2,3-diol, 2-butene-1,4-diol, benzyl alcohol, 1-phenylethanol, 2-hydroxyacetophenone, benzopinacol, benzoin, hydrobenzoin, 2-hydroxy-1-phenyl-2-p-tolyl-ethanone, benzhydrol, and combinations thereof;
    wherein the composition excludes flame retardants other than compounds approved for use as food additives by the United States Food and Drug Administration as of Oct. 31, 2006; and
    wherein the composition comprises less than 0.01 weight percent of trihydrocarbyl phosphites.

2. The article of claim 1, wherein the article is a food service article selected from the group consisting of food service trays, food service bins, prepared food containers, fluid reservoirs, measuring cups, scoops, and kitchen tools.

3. The article of claim 1, wherein the article is a healthcare article selected from the group consisting of transparent parts of medical devices, transparent parts of delivery devices, transparent parts of diagnostic equipment, containers for solids, and containers for liquids.

4. The article of claim 1, wherein the article is an animal care article selected from the group consisting of animal cages, water bowls, food bowls, and animal toys.

5. The article of claim 1, wherein the article is a toy.

6. The article of claim 1, wherein the article is an appliance part selected from the group consisting of refrigerator door racks, refrigerator trays, refrigerator bins, and door panels for front-loading washing machines.

7. The article of claim 1, wherein the polystyrene-poly (ethylene-butylene)-polystyrene triblock copolymer has a polystyrene content of 60 to 75 weight percent.

8. The article of claim 1, wherein the composition comprises less than 1 weight percent of each of polyolefins, polyamides, and polyesters.

9. The article of claim 1, wherein the composition comprises less than 0.1 weight percent of any polymer other than the poly(phenylene ether), the radial block copolymer, the polystyrene-poly(ethylene-butylene)-polystyrene triblock copolymer, and the hydrogenated terpene resin.

10. The article of claim 1, wherein the composition excludes flame retardants.

11. An article comprising a composition comprising the product of melt blending components comprising, based on the total weight of blended components:
- 60 to 70 weight percent poly(phenylene ether); wherein the poly(phenylene ether) comprises 2,6-dimethyl-1,4-phenylene ether units, 2,3,6-trimethyl-1,4-phenylene ether units, or a combination thereof;
- 15 to 25 weight percent of a radial block copolymer of styrene and butadiene; wherein the radial block copolymer comprises 60 to 70 weight percent of polystyrene content based on the weight of the radial block copolymer, and has a number average molecular weight of 50,000 to 70,000 atomic mass units;
- 7.5 to 13 weight percent of a polystyrene-poly(ethylene-butylene)-polystyrene triblock copolymer comprises a polystyrene content of 60 to 75 weight percent based on the weight of the polystyrene-poly(ethylene-butylene)-polystyrene triblock copolymer;
- 3 to 7 weight percent of a hydrogenated terpene resin having a softening point of 145 to 155° C. measured according to ASTM E28; and
- 0.25 to 1 weight percent benzoin;
- wherein the composition excludes flame retardants; and
- wherein the composition excludes trihydrocarbyl phosphites.

12. A composition comprising the product of melt blending components comprising, based on the total weight of blended components:
- 44 to 74.9 weight percent poly(phenylene ether);
- 15 to 30 weight percent of a radial block copolymer of an alkenyl aromatic monomer and a conjugated diene; wherein the radial block copolymer comprises 60 to 70 weight percent of poly(alkenyl aromatic) content based on the weight of the radial block copolymer, and has a number average molecular weight of 50,000 to 70,000 atomic mass units;
- 7.5 to 15 weight percent of a polystyrene-poly(ethylene-butylene)-polystyrene triblock copolymer having a polystyrene content of 55 to 80 weight percent based on the weight of the triblock copolymer;
- 2.5 to 7.5 weight percent of a hydrogenated terpene resin having a softening point of 145 to 155° C. measured according to ASTM E28; and
- 0.1 to 2 weight percent of a hydroxy compound selected from the group consisting of hydroxyacetone, acetoin, allyl alcohol, pinacol, 2,3-diphenylbutane-2,3-diol, 2-butene-1,4-diol, benzyl alcohol, 1-phenylethanol, 2-hydroxyacetophenone, benzopinacol, benzoin, hydrobenzoin, 2-hydroxy-1-phenyl-2-p-tolyl-ethanone, benzhydrol, and combinations thereof;
- wherein the composition excludes flame retardants other than compounds approved for use as food additives by the United States Food and Drug Administration as of Oct. 31, 2006; and
- wherein the composition comprises less than 0.01 weight percent of trihydrocarbyl phosphites.

13. The composition of claim 12,
- wherein the poly(phenylene ether) comprises 2,6-dimethyl-1,4-phenylene ether units, 2,3,6-trimethyl-1,4-phenylene ether units, or a combination thereof;
- wherein the components melt-blended to form the composition comprise 60 to 70 weight percent poly(phenylene ether);
- wherein the components melt-blended to form the composition comprise 15 to 25 weight percent of the radial block copolymer;
- wherein the polystyrene-poly(ethylene-butylene)-polystyrene triblock copolymer comprises a polystyrene content of 60 to 75 weight percent based on the weight of the polystyrene-poly(ethylene-butylene)-polystyrene triblock copolymer;
- wherein the components melt-blended to form the composition comprise 7.5 to 13 weight percent of the polystyrene-poly(ethylene-butylene)-polystyrene triblock copolymer;
- wherein the components melt-blended to form the composition comprise 3 to 7 weight percent of the hydrogenated terpene resin;
- wherein the hydroxy compound comprises benzoin;
- wherein the components melt-blended to form the composition comprise 0.25 to 1 weight percent of the hydroxy compound;
- wherein the composition excludes flame retardants; and
- wherein the composition excludes trihydrocarbyl phosphites.

\* \* \* \* \*